United States Patent Office 3,481,939
Patented Dec. 2, 1969

3,481,939
TERTIARYAMINOCYCLOBUTANES WITH ELECTRONEGATIVE SUBSTITUENTS
Kent C. Brannock, Kingsport, Tenn., assignor to Eastman Kodak Company, Rochester, N.Y., a corporation of New Jersey
No Drawing. Application Mar. 15, 1965, Ser. No. 440,017, now Patent No. 3,369,024, dated Feb. 13, 1968, which is a continuation-in-part of application Ser. No. 115,305, June 7, 1961. Divided and this application June 26, 1967, Ser. No. 648,974
Int. Cl. C07d 29/34; C07c 147/02; A61k 27/00
U.S. Cl. 260—293.4                                   8 Claims

ABSTRACT OF THE DISCLOSURE

Tertiaryaminocyclobutanes with electronegative substituents useful as stabilizers, synergists, pharmaceuticals and chemical intermediates having the formula:

$$\begin{array}{c} R^1 \;\; R^2 \\ | \;\;\; | \\ X-C-C-R^3 \\ | \;\;\; | \\ Y-HC-CH-Z \end{array}$$

wherein X is a tetriaryamino group having a formula selected from the group consisting of:

(a) $\begin{array}{c} R^4 \\ \diagdown \\ N- \\ \diagup \\ R^5 \end{array}$ and (b) $\begin{array}{c} R^2 \;\; R^1 \\ | \;\;\; | \;\;\; \overset{R^6}{\frown} \\ R^3-C-C-N \;\; N- \\ | \;\;\; | \;\;\; \underset{R^6}{\smile} \\ Z-CH-CH-Y \end{array}$ Y is alkylsulfonyl of the formula —$SO_2R^7$; Z is hydrogen, mononuclear carbocyclic aryl, or alkylsulfonyl of the formula —$SO_2R^7$; wherein at least one of the substituents $R^1$ and $R^2$ is hydrogen; and wherein each of $R^1$ and $R^2$, when taken singly, is selected from the group consisting of:
  (a) hydrogen and
  (b) alkyl of 1 to 18 carbons;
wherein $R^3$, when taken singly and when only one of the substituents $R^1$ and $R^2$ is hydrogen, is alkyl of 1 to 18 carbons and $R^3$, when taken singly and when both $R^1$ and $R^2$ are hydrogen is selected from the group consisting of:
  (a) alkyl of 1 to 18 carbons,
  (b) mononuclear carbocyclic aryl, and
  (c) tertiaryaminomethyl of the formula —$CH_2X$
wherein $R^1$ and $R^3$, when taken collectively with the carbon atoms to which they are attached, represent a saturated alicyclic group having 5 to 8 ring atoms;
wherein $R^2$ and $R^3$, when taken collectively with the carbon atom to which they are attached, represent a saturated carbocyclic group having 4 to 8 ring carbon atoms;
wherein each of $R^4$ and $R^5$, when taken singly, is alkyl of 1 to 18 carbons and $R^4$ and $R^5$, when taken collectively with the nitrogen atom to which they are attached, represents a saturated heterocyclic group having 5 to 6 ring atoms;
each of the substituents of $R^6$ is the same alkylene group of 1 to 3 carbon atoms; and
$R^7$ is alkyl of 1 to 18 carbons.

---

This application is a division of my copending application Ser. No. 440,017, filed Mar. 15, 1965, now U.S. Patent No. 3,369,024, which was copending with and a continuation-in-part of my applications Ser. No. 115,305, filed June 7, 1961, now abandoned, and Ser. No. 34,881, filed June 9, 1960, now abandoned, said application Ser. No. 34,881 having been copending with and a continuation-in-part of my application Ser. No. 837,579, filed Sept. 2, 1959, now abandoned.

This invention relates to novel chemical compounds and to their preparation and more particularly to novel tertiaryaminocyclobutanes having electronegative substituents which can be represented by the generic formula:

(I) $$\begin{array}{c} R^1 \;\; R^2 \\ | \;\;\; | \\ X-C-C-R^3 \\ | \;\;\; | \\ Y-CH-CH-Z \end{array}$$

and their preparation by the reaction of an enamine of the formula:

(II) $$\begin{array}{c} R^1 \;\; R^2 \\ | \;\;\; | \\ X-C=C-R^3 \end{array}$$

and a substituted olefin of the formula:

(III) $\quad\quad\quad$ Y—CH=CH—Z

In the above generic formula for the novel tertiaryaminocyclobutanes of my invention, the substituents $R^1$ and $R^2$, when taken singly, can be hydrogen or alkyl. At least one of the substituents $R^1$ and $R^2$ must be hydrogen.

The substituent $R^3$, when taken singly, is alkyl when only one of the substituents $R^1$ or $R^2$ is hydrogen and, when taken singly, is alkyl, aryl or tertiaryaminomethyl when both $R^1$ and $R^2$ are hydrogen.

$R^1$ and $R^3$, when taken collectively with the carbon atoms to which they are attached, represent an alicyclic group of about 5 to about 8 ring atoms.

$R^2$ and $R^3$, when taken collectively with the carbon atom to which they are attached, represent an alicyclic group of about 4 to about 8 carbon atoms.

The substituent X is a tertiaryamino group, and the substituent Y, when taken singly, is an electronegative radical selected from the group consisting of nitrile, nitro, alkylsulfonyl, alkoxycarbonyl and carboxy. The substituent Z, when taken singly, can be hydrogen, aryl, or one of the electronegative substituents which Y can be, i.e., nitrile, nitro, alkylsulfonyl, alkoxycarbonyl or carboxy.

The substituents Y and Z, when taken collectively with the carbon atoms to which they are attached, can represent an N-alkyl-2,5-dioxopyrrolidin-3,4-ylene group.

In the formulae for the enamine reactants and the substituted olefin reactants useful in manufacturing the novel tertiaryaminocyclobutane of my invention, the substituents X, $R^1$, $R^2$ and $R^3$ have the meanings previously discussed for the tertiaryaminocyclobutanes.

The substituent Y of the substituted olefin, when taken singly, is an electronegative radical such as nitrile, nitro, alkylsulfonyl or alkoxycarbonyl and the substituent Z of the substituted olefin, when taken singly, can be hydrogen, aryl, nitrile, nitro, alkylsulfonyl or alkoxycarbonyl. The substituents Y and Z of the substituted olefin, when taken collectively with the carbon atoms to which they are attached, represent an N - alkyl-2,4-dioxopyyrolidin-3,4-ylene group.

The novel tertiaryaminocyclobutanes having electronegative substituents are useful as sludge and color stabilizers for hydrocarbon fuel oils, as synergists for gasoline antioxidants, and as pharmaceuticals, e.g., analgesics, and as pharmaceutical and chemical intermediates.

The tertiaryaminocyclobutanes of my invention generally fall into three classes, depending upon the type of enamine reactant used in their preparation.

Enamines having no β hydrogen atom, i.e., enamines derived from the reaction of secondary amines and aldehydes having one α hydrogen atom, when reacted with a substituted olefin in accordance with the process of the invention, yield tertiaryaminocyclobutanes in which the substituent R¹ is hydrogen, i.e., tertiaryaminocyclobutanes of the formula:

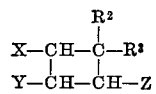

(IV)

in which the substituents R², R³, X, Y and Z are as hereinbefore defined. In accordance with the previous definitions, each of R² and R³ in the Formula IV, above, when taken singly, is alkyl and R² and R³, when taken collectively with the carbon atom to which they are attached, represent an alicyclic group having about 4 to about 8 ring atoms.

Enamines having an α and a β hydrogen atom, i.e., enamines derived from the reaction of secondary amines and aldehydes having two α hydrogen atoms, when reacted with a substituted olefin in accordance with the process of the invention, yield tertiaryaminocyclobutanes in which the substituents R¹ and R² are hydrogen, i.e., tertiary-aminocyclobutanes of the formula:

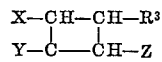

(V)

in which the substituents R³, X, Y and Z are as hereinbefore defined. In accordance with the previous definitions, R³ is alkyl, aryl or tertiaryaminomethyl.

Enamines having no α hydrogen atoms, i.e., enamines derived from the reaction of secondary amines and ketones having two α hydrogen atoms, when reacted with a substituted olefin in accordance with the process of the invention, yield tertiaryaminocyclobutanes in which the substituent R² is hydrogen, i.e., tertiaryaminocyclobutanes of the formula:

(VI)

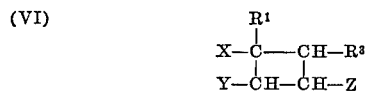

in which the substituents R¹, R³, X, Y and Z are as hereinbefore defined. In accordance with the previous definitions, each of R¹ and R³, when taken singly, is alkyl and R¹ and R³, when taken collectively, represent an alicyclic group having about 4 to about 8 ring atoms.

The enamines used in the process of my invention are prepared by the reaction of certain aldehydes or ketones with a secondary amine as described in U.S. Patent 2,578,787. The general reaction between the aldehyde or ketone and the secondary amine can be represented by the equation:

(A)

$$X-H + R^1-\overset{O}{\overset{\|}{C}}-\overset{R^2}{\underset{|}{C}H}-R^3 \longrightarrow X-\overset{R^1}{\underset{|}{C}}=\overset{R^2}{\underset{|}{C}}-R^3 + H_2O$$

In the above equation, the substituents R¹, R², R³ and X have the meanings previously assigned.

The preparation of enamines having no β hydrogen atom from secondary amines and aldehydes having one α hydrogen atom, i.e., the enamiens used in the process of the invention to prepare the tertiaryaminocyclobutanes of the Formula IV, can be represented by the equation:

B)

$$X-H + H\overset{O}{\overset{\|}{C}}-\overset{R^2}{\underset{|}{C}H}-R^3 \longrightarrow X-CH=\overset{R^2}{\underset{|}{C}}-R^3 + H_2O$$

The preparation of enamines having an α and a β hydrogen atom from secondary amines and aldehydes having two α hydrogen atoms, i.e., the enamines used in the preparation of the tertiaryaminocyclobutanes of Formula V can be represented by the equation:

C)

$$X-H + H\overset{O}{\overset{\|}{C}}-CH_2-R^3 \longrightarrow X-CH=CH-R^3 + H_2O$$

The preparation of enamines having no α hydrogen atom from secondary amines and ketones having two α hydrogen atoms, i.e., the enamines employed in preparing the tertiaryaminocyclobutanes of Formula VI can be represented by the equation:

(D)

$$X-H + R^1-\overset{O}{\overset{\|}{C}}-CH_2-R^3 \longrightarrow X-\overset{R^1}{\underset{|}{C}}=CH-R^3 + H_2O.$$

The substituents R¹, R² and R³ of the preceding formulae, when alkyl, are typically alkyl of 1 to about 18 carbon atoms and are preferably lower alkyl, e.g., alkyl of 1 to about 5 carbon atoms. Examples of the alkyl substituents which R¹, R² and R³ can be include, methyl, ethyl, n-propyl, isopropyl, n-butyl, isobutyl, tert-butyl, n-amyl, n-hexyl, n-heptyl, 2-ethylhexyl, n-decyl, n-dodecyl, tridecyl, pentadecyl, octadecyl, etc.

The substituent R³, when aryl, is typically aryl of 6 to about 10 carbon atoms and is preferably mononuclear carbocyclic aryl of 6 to about 10 carbon atoms. Examples of the aryl substituents which R³ can be include phenyl, naphthyl, o-tolyl, m-tolyl, p-tolyl, xylyl, etc.

The substituent R³, when tertiaryaminomethyl, can be represented by the formula X—CH₂— wherein X is a tertiaryamino group as described hereinbefore and as more fully described hereinafter.

The substituents R¹ and R³, when taken collectively with the carbon atoms to which they are attached to represent an alicyclic group having 5 to 8 ring atoms, typically represent a carbocyclic or heterocyclic group. Examples of the carbocyclic or heterocyclic groups represented by R¹ and R³, when taken collectively with the carbon atoms to which they are attached, are groups such as 1,2-cyclopentylene; 1,2-cyclohexylene; 1,2-cycloheptylene; 1,2-cyclooctylene; tetrahydrofuran - 3,4-ylene; tetrahydrofuran-2,3-ylene; N - methylpiperidin-2,3 - ylene; N-methylpiperidin-3,4-ylene; etc. Preferred are the saturated alicyclic groups. Examples of compounds in which R¹ and R³ are taken collectively with the carbon atoms to which they are attached to represent a saturated alicyclic group are bicyclic compounds having the formulae:

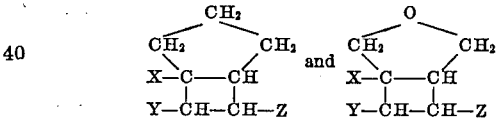

wherein X, Y and Z are as hereinbefore defined.

The substituents R² and R³, when taken collectively with the carbon atom to which they are attached to represent an alicyclic group having 4 to 8 ring carbon atoms, preferably represent a saturated carbocyclic group such as cyclobutylidene, cyclopentylidene, cyclohexylidene, cycloheptylidene, cyclooctylidene, etc. Examples of typical compounds in which R² and R³, when taken collectively with the carbon to which they are attached, represent such an alicyclic group are those of the formulae:

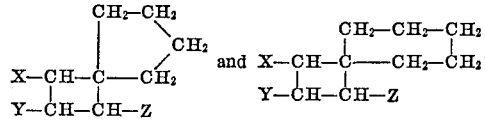

wherein X, Y and Z are as hereinbefore defined.

The substituent X is a tertiaryamino group, i.e., an amino group having no labile hydrogen atoms. Typical of the suitable tertiarylamine groups of the tertiarylaminocyclobutane are those which can be represented by the formulae:

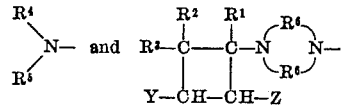

in which Y, Z, R¹, R² and R³ are as hereinbefore defined; R⁴ and R⁵, when taken singly, are alkyl and, when taken collectively with nitrogen atom to which they are attached, represent a heterocyclic group having about 5 to about 6 ring atoms; and each of the substituents R⁶ is the same alkylene group of 1 to 3 carbon atoms. Typical of the suitable tertiarylamine groups of the enamine reactant are those of the formulae:

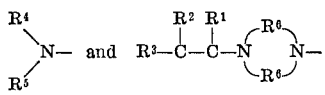

in which $R^1$, $R^2$, $R^3$, $R^4$, $R^5$ and $R^6$ are as hereinbefore defined and more fully described hereinafter.

The substituents $R^4$ and $R^5$, when alkyl, are typically alkyl of 1 to about 18 carbon atoms and are preferably lower alkyl, e.g., alkyl of 1 to about 5 carbon atoms. Examples of the alkyl substituents which $R^4$ and $R^5$ can be include methyl, ethyl, n-propyl, n-butyl, isobutyl, tert-butyl, n-amyl, n-hexyl, n-heptyl, 2-ethylhexyl, n-decyl, n-dodecyl, tridecyl, pentadecyl, octadecyl, etc.

The substituents $R^4$ and $R^5$, when taken collectively with the nitrogen atom to which they are attached to represent a heterocyclic ring of about 5 to about 6 ring atoms, preferably represent a saturated heterocyclic ring such as pyrrolidinyl, piperidino, morpholino, etc.

The alkylene groups represented by $R^6$ are preferably ethylene groups. The tertiarylaminocyclobutane then has the formula:

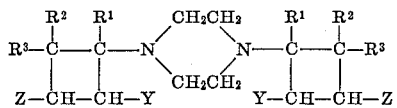

and the enamine from which the above tertiarylaminocyclobutane is prepared has the formula:

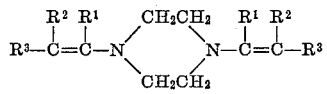

wherein Y, Z, $R^1$, $R^2$ and $R^3$ have the meanings assigned hereinbefore.

The substituents Y and Z, when electronegative radicals, are electron withdrawing groups. When the substituents Y and Z are alkylsulfonyl or alkoxycarbonyl, they can be represented by the formulae —$CO_2R^7$ or —$COOR^7$ in which $R^7$ is alkyl. The alkyl group $R^7$ is typically alkyl of 1 to 18 carbon atoms and is preferably lower alkyl, e.g., alkyl of 1 to about 5 carbon atoms. Examples of the alkyl substituents represented by $R^7$ are groups such as methyl, ethyl, n-propyl, isopropyl, n-butyl, isobutyl, tert-butyl, n-amyl, n-hexyl, n-heptyl, 2-ethylhexyl, n-decyl, n-dodecyl, tridecyl, pentadecyl, octadecyl, etc.

The substituent Z, when aryl, is typically aryl of 6 to about 10 carbon atoms and is preferably mononuclear carbocyclic aryl of 6 to about 10 carbon atoms. Examples of the aryl substituents which Z can be include phenyl, naphthyl, o-tolyl, m-tolyl, p-tolyl, xylyl, etc.

The compounds in which Y and Z, when taken collectively with the carbon atoms to which they are attached, represent an n-alkyl-2,4-dioxopyrrolidin - 3,4-ylene group have the formula:

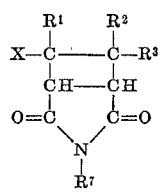

in which X, $R^1$, $R^2$, $R^3$ and $R^7$ have the meanings previously assigned.

Also included within the scope of the invention are acid addition salts of the hereinbefore described tertiaryaminocyclobutanes. These salts are also useful as pharmaceuticals and as pharmaceutical or chemical intermediates and are prepared by the conventional techniques of neutralizing the tertiaryaminocyclobutane with an organic or inorganic acid. Typical of the useful salt forming acids are those such as hydrochloric acid, sulfuric acid, phosphoric acid, citric acid, acetic acid, maleic acid, molonic the following general equation:

As previously stated, the novel tertiarylaminocyclobutanes having electronegative substituents are prepared by reacting certain enamines with certain substituted olefins. The process of the invention can be represented by the following general equation:

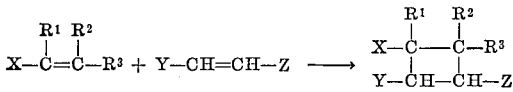

in which $R^1$, $R^2$, $R^3$, X, Y and Z have the meanings hereinbefore assigned.

In general, the process of the invention is carried out by contacting the enamine and the olefin at a temperature below the temperature of thermal decomposition of the reactants or products.

Suitable reaction temperatures depend upon the characteristics of the reactants and products. In the case of the preparation of tertiaryaminocyclobutanes from substituted olefins and enamines having no β hydrogen atom, i.e., the enamines of Formula B, reaction temperatures of about 0° C. up to about 200° C. or higher are generally suitable so long as the temperature of thermal decomposition of the reactants and products is not exceeded. A preferred temperature range for effecting the reaction between a substituted olefin and an enamine having no β hydrogen atoms is from about 50° C. to about 190° C.

In the case of the preparation of tertiaryaminocyclobutanes from substituted olefins and enamines having an α and a β hydrogen atom, i.e., the enamines of Formula C, reaction temperatures of from about 0° C. up to about 150° C. or higher are generally suitable so long as the temperature of thermal decomposition of the reactants and products is not exceeded.

In the case of the preparation of tertiaryaminocyclobutanes from substituted olefins and enamines having no α hydrogen atom, i.e., the enamines of Formula D, reaction temperatures of from about 0° C. up to about 55° C. or higher are generally suitable so long as the temperature of thermal decomposition of the reactants and products is not exceeded.

The relative proportions of the reactants can be varied widely in carring out the process of the invention. Thus, a stoichiometric equivalent of the enamine and the substituted olefin can be employed or a stoichiometric excess of either the enamine or the substituted olefin can be used. In general, it is preferred to employ stoichiometric equivalents of the reactants in accordance with usual chemical practice.

The process of the invention is ordinarily carried out at atmospheric pressure. However, subatmospheric or superatmospheric pressures can be employed and are sometimes preferred. No catalyst is required to effect the reaction.

The process of the invention can be carried out with a solvent or without a solvent. Examples of suitable solvents include acetonitrile, propionitrile, butyronitrile, dimethyl formamide, dimethyl acetamide, propylene carbonate, ethylene carbonate, methyl isoamyl ketone, methanol, ethanol, nitrobenzene, dimethylsulfoxide, ethyl acetate, benzene, heptane, carbon tetrachloride, dioxane, diethyl ether, dibutyl ether, etc. Preferred are the solvents having a high dielectric constant and particularly preferred, when a solvent is employed, is a dipolar aprotic solvent.

Typical reaction times vary from a few minutes to one or more days, e.g., 24 to 48 hours or longer, depending mainly on the reaction temperature and reactants employed. However, longer or shorter reaction periods can be utilized.

The process of the invention affords the tertiaryaminocyclobutanes in high yields. The tertiaryaminocyclobutane product can be worked-up or purified by conventional purification methods, the preferred method varying with the properties of the product. Particularly effective purification methods include fractional distillation under reduced pressure and fractional crystallization from solvents. However, other purification methods, e.g., solvent extraction, chromatographic adsorption, molecular distillation, etc., can be employed and are often preferred. In some instances, it is unnecessary to purify the tertiary-aminocyclobutane since the crude reaction product is satisfactory for the intended use, e.g., when the tertiary-aminocyclobutane is employed as a chemical or pharmaceutical intermediate.

The compounds of the invention in which the substituents Y or Z are carboxyl are most readily prepared from the corresponding esters, e.g., by hydrolysis of the corresponding ester. The hydrolysis of the ester can be accomplished by conventional procedures, e.g., by heating with an aqueous dilute mineral acid.

The following examples illustrates the process and compounds of the invention.

EXAMPLE 1

A mixture of N-isobutenylpiperidine (69.5 g., 0.5 mole) and acrylonitrile (26.5 g. 0.5 mole) was heated in an autoclave for 2 hours at 175° C. Distillation of the reaction mixture gave 3.5 g. of acrylonitrile, 17 g. of N-isobutenylpiperidine, and 59.5 g. (62% conversion) of 3,3-dimethyl-2-(piperidino)cyclobutanecarbonitrile, B.P. 94–99° C. at 1.8–2.0 mm. $N_D^{20}$ 1.4780.

EXAMPLE 2

A mixture of N-isobutenylpiperidine (139 g., 1.0 mole) and methyl acrylate (86 g., 1.0 mole) was heated in an autoclave for two hours at 180° C. Distillation of the reaction mixture gave, after removal of the unreacted methyl acrylate and N-isobutenylpiperidine, 157 g. (70% conversion) of methyl 3,3-dimethyl - 2 - (piperidino)cyclobutanecarboxylate, B.P. 103° C. at 3.7 mm., $N_D^{20}$ 1.4705.

EXAMPLE 3

To β-nitrostyrene (47.5 g., 0.32 mole) was added N,N-dimethylisobutenylamine (33 g., 0.33 mole). The mixture was stirred manually and the temperature rose to 92° C. over a two-minute period and then began to drop slowly. After about 15 minutes, the reaction mixture crystallized. It was triturated with hexane and filtered to give 74.5 g. (94% yield) of crude N,N-dimethyl-2,2-dimethyl-3-phenyl-4-nitrocyclobutylamine, M.P. 86–91° C. On recrystallization from hexane, the product melted at 90–92° C. Analysis showed 67.91% carbon, 8.34% hydrogen and 11.49% nitrogen as compared to calculated values of 67.72% carbon, 8.11% hydrogen and 11.28% nitrogen.

EXAMPLE 4

Reacted as described in Example 3, a 0.32 mole portion of β-nitrostyrene and a 0.33 mole portion of N-isobutenylpiperidine gave a substantially quantitative yield of 1-(2,2-dimethyl-4-nitro - 3 - phenylcyclobutyl)piperidine, M.P. 70–72° C. Analysis showed 70.57% carbon, 8.52% hydrogen, and 9.67% nitrogen as compared to calculated values of 70.80% carbon, 8.39% hydrogen and 9.71% nitrogen.

EXAMPLE 5

A mixture of N,N-dimethylisobutenylamine (297 g., 3 moles) and methyl acrylate (258 g., 3 moles) was heated for 2 hours at 170° C. in an autoclave. Distillation of the reaction mixture gave, after removal of unreacted starting materials, 419 grams (75% yield) of methyl 3,3-dimethyl - 2 - dimethylaminocyclobutanecarboxylate B.P. 49–50° C. at 1.5 mm., $N_D^{20}$ 1.4448.

EXAMPLE 6

A mixture of N,N-dimethylisobutenylamine (297 g., 3 moles) and acrylonitrile (159 g., 3 moles) was heated for 2 hours at 170° C. in an autoclave. Distillation of the reaction mixture gave, after removal of unreacted starting materials, 292 grams (64% yield) of 3,3-dimethyl-2-dimethylaminocyclobutanecarbonitrile B.P. 44–45° C. at ca 1 mm., $N_D^{20}$ 1.4531.

EXAMPLE 7

A mixture of N,N-dimethylisobutenylamine (28 g., 0.283 mole) and methyl vinyl sulfone (28 g., 0.264 mole) was heated at atmospheric pressure. When the temperature reached 90° C., the mixture became homogenous. The temperature was raised over a two-hour period to 160° C., and the reaction mixture was then distilled to give 49 grams (91% yield) of N,N-2,2-tetramethyl-4-methylsulfonylcyclobutylamine, B.P. 100–103° C. at 0.5–0.6 mm. The product was crystallized and melted at 85–86° C.

EXAMPLE 8

A mixture of N,N-dimethylisobutenylamine (82 g., 0.83 mole) and diethylmaleate (172 g., 1 mole) was heated under reflux for 18 hours, during which time the temperature of the mixture rose from 105° C. to 162° C. Distillation of the reaction mixture gave, after removal of unreacted starting materials, 150.5 g. (67% yield) of diethyl 3,3-dimethyl - 4 - dimethylaminocyclobutane-1,2-dicarboxylate, B.P. 93–94° C. at 1.5 mm., $N_D^{20}$ 1.4502.

EXAMPLE 9

A mixture of N-isobutenylpiperidine (208.5 g., 1.5 moles) and diethylmaleate (322.5 g., 1.877 moles) was heated at 150° C. for 5½ hours. Distillation of the reaction mixture gave, after removal of unreacted starting materials, 274 g. of diethyl 3,3-dimethyl - 4 - (piperidino)cyclobutane-1,2-dicarboxylate, B.P. 113–120° C. at 1.0–1.5 mm., $N_D^{20}$ 1.4663.

EXAMPLE 10

A one mole proportion of N-(2-ethyl-1-butenyl)piperidine was reacted with a one mole proportion of methyl acrylate for 2 hours at 170° C. in an autoclave. The resulting reaction product was distilled to separate the cyclobutane derivative, methyl 3,3-diethyl - 2 - (piperidino)cyclobutanecarboxylate, B.P. 119–121° C. at 2 mm., $N_D^{20}$ 1.4788.

EXAMPLE 11

A one mole proportion of 1,4-diisobutenylpiperazine and a two mole proportion of methyl acrylate were reacted for 2 hours at 170° C. in an autoclave. The resulting reaction product was triturated with hexane and filtered to give the cyclobutane derivative, 1,4-bis(4-methoxycarbonyl - 2,2 - dimethylcyclobutyl)piperazine, M.P. 148° C.

EXAMPLE 12

A one mole proportion of N-isobutenylmorpholine was reacted with a one mole proportion of methyl acrylate for 2 hours at 170° C. in an autoclave. The resulting reaction product was distilled to separate the cyclobutane derivative, methyl 3,3-dimethyl-2-morpholinocyclobutanecarboxylate, B.P. 101–102° C. at 2.2 mm., $N_D^{20}$ 1.4711.

EXAMPLE 13

A one mole proportion of 1-cyclohexylidenemethylpiperidine was reacted with a one mole proportion of methyl acrylate for 2 hours at 170° C. in an autoclave. The resulting reaction product was distilled to separate the cyclobutane derivative, methyl 1-piperidino-spiro[3.5]nonane-2-carboxylate, B.P. 115–120° C. at 0.5–1 mm., $N_D^{20}$ 1.4963.

EXAMPLE 14

A one mole proportion of N,N-di-n-butylisobutenylamine was reacted with a one mole proportion of methyl acrylate for 2 hours at 170° C. in an autoclave. The resulting reaction product was distilled to separate the cyclobutane derivative, methyl 3,3-dimethyl-2 - di - n - butylaminocyclobutanecarboxylate, B.P. 98° C. at ca. 1.5 mm., $N_D^{20}$ 1.4543.

EXAMPLE 15

A one mole proportion of N,N-diisobutylisobutenyl-amine was reacted with a one mole proportion of methyl acrylate for 2 hours at 170° C. in an autoclave to give the resulting reaction product, methyl 3,3 - dimethyl - 2 - diisobutylaminocyclobutanecarboxylate, B.P. 93–100° C. at ca. 2 mm., $N_D^{20}$ 1.4510.

EXAMPLE 16

N-1-butenylpiperidine (69.5 g., 0.5 mole), 150 ml. of acetonitrile and methyl acrylate (43 g., 0.5 mole) were combined. There was a mildly exothermic reaction with the temperature rising to 30° C. for about 1 hour and then dropping to room temperature. After standing at room temperature for 2 days, distillation gave, after removal of the solvent and low boilers, 86 g. (77%) of methyl 3-ethyl - 2 - piperidinocyclobutanecarboxylate, B.P. 87–90° C. at 0.75 mm., $N_D^{20}$ 1.4733.

EXAMPLE 17

When a mixture of N-1-butenylpiperidine (45 g., 0.32 mole), 75 ml. of acetonitrile and diethyl maleate (55 g., 0.32 mole) was allowed to stand 24 hours and subjected to molecular distillation at 69–70° C. at 100 microns, a 45% yield of diethyl 4-ethyl-3-piperidino-1,2-cyclobutanedicarboxylate, $N_D^{20}$ 1.4690, was obtained.

EXAMPLE 18

When Example 16 was repeated and the reaction mixture was refluxed for 3 hours at 86° C. (rather than standing for 2 days), an 82% yield of the same product was obtained.

EXAMPLE 19

N-1-propenylpiperidine (62 g., 0.5 mole), methyl acrylate (43 g., 0.5 mole) and 100 ml. of acetonitrile were refluxed at 85° C. for 2 hours and the mixture was distilled to give 71 g. (67.5% yield) of methyl 3-methyl-2-piperidinocyclobutanecarboxylate B.P. 70–75° C. at 0.5 mm., $N_D^{20}$ 1.4741.

EXAMPLE 20

Example 16 was repeated without acetonitrile as a solvent. The same product was obtained, but only in 54% yield. By following the reaction by means of the infrared spectrum of the reaction mixture, it is found that the rate is appreciably faster in solvents of high dielectric constant such as acetonitrile.

EXAMPLE 21

Reaction of N,N-dimethyl-1-butenylamine (43 g., 0.43 mole) and methyl acrylate (37 g., 0.43 mole) in 100 ml. of acetonitrile for 20 hours at room temperature gave 69 g. (87%) of methyl 3-ethyl-2-dimethylaminocyclobutanecarboxylate, B.P. 52–53° C. at 1 mm., $N_D^{20}$ 1.4454.

EXAMPLE 22

By the method described in Example 21, N,N-dimethyl-1-butenylamine and diethylmaleate gave a 79% yield of diethyl 4 - ethyl - 3 - dimethylamino - 1,2 - cyclobutanedicarboxylate, B.P. 95–98° C. at 0.8 mm., $N_D^{20}$ 1.4482.

EXAMPLE 23

N-1-propenylpiperidine (36 g., 0.288 mole), 75 ml. of acetonitrile and methyl vinyl sulfone (30 g., 0.283 mole) were refluxed for 3 hours at 85° C. Distillation gave 37 g. (57%) of 3-methyl-2-piperidino-1-methylsulfonylcyclobutane, B.P. 127–130° C. at 4 mm., $N_D^{20}$ 1.4954.

EXAMPLE 24

Methyl 3 - phenyl - 2 - dimethylaminocyclobutanecarboxylate, B.P. 49° C. at 1 micron, $N_D^{20}$ 1.5190, was prepared by reacting methyl acrylate and an enamine having the formula:

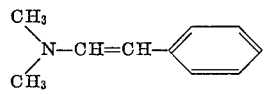

in substantially equal molar proportions as described in Example 16.

EXAMPLE 25

Diethyl 4 - phenyl - 3 - dimethylamino - 1,2 - cyclobutanedicarboxylate, B.P. 79° C. at 1 micron, $N_D^{20}$ 1.5015, was prepared by reacting diethylmaleate and the enamine described in Example 24 in substantially equal molar proportions as described in Example 16.

EXAMPLE 26

Methyl 3 - dimethylaminomethyl - 2 - dimethylaminocyclobutanecarboxylate, B.P. 78–82° C. at .75 mm., $N_D^{20}$ 1.4592, was prepared by reacting methyl acrylate and 1,3-bis dimethylamino-1-propene in substantially equal molar proportions as described in Example 16.

EXAMPLE 27

Diethyl 4 - dimethylaminomethyl - 3 - dimethylamino-1,2-cyclobutanedicarboxylate, B.P. 50° C. at 6 microns, $N_D^{20}$ 1.4562, was prepared by reacting diethylmaleate and 1,3-bis dimethylamino-1-propene in substantially equal molar proportions as described in Example 16.

EXAMPLE 28

N-(1-cyclopentenyl)piperidine, methyl acrylate, and acetonitrile containing a pinch of hydroquinone were combined. An exothermic reaction occurred, bu the temperature of the reaction mixture was maintained below 30° C. by intermittent cooling. After standing for 4½ hours at room temperature, the solvent was removed by distillation under reduced pressure while maintaining the temperature below 30° C. Infrared analysis of the undistilled material disclosed the presence of methyl 1-piperidinobicyclo[3.2.0]heptane-1-carboxylate.

EXAMPLE 29

N-(1-cyclopentenyl)piperidine (75.5 g., 0.5 mole), diethyl maleate (86 g., 0.5 mole), and acetonitrile (125 ml.), were combined. An exothermic reaction occurred and the temperature rose to a maximum of 63° C. within 17 minutes. After letting the mixture stand for 1 hour, the solvent was removed by distillation under reduced pressure, leaving 170 g. of crude diethyl 1-piperidinobicyclo[3.2.0]heptane - 6,7 - dicarboxylate. An infrared spectrum on this material was consistent with the assigned structure.

EXAMPLE 30

N-(1-cycloehxenyl)dimethylamine (75 g., 0.6 mole), diethyl maleate (103 g., 0.6 mole), and acetonitrile (100 ml.) were combined. An exothermic reaction occurred and the temperature was maintained below 40° C. by means of intermittent cooling. After standing for 3½ hours, the mixture was divided into two equal portions. One portion was distilled in an alembic type pot molecular still to give 81 g. (91%) of diethyl 1-dimethylaminobicyclo[4.2.0]octane-7,8-dicarboxylate, boiling at 65–67° C. at ca. 1–5 μ. The infrared spectrum was in agreement with the assigned structure.

*Analysis.*—Calcd. for $C_{16}H_{27}O_4$: C, 64.7; H, 9.17; N, 4.72. Found: C, 64.52; H, 9.02; N, 4.54.

EXAMPLE 31

N-(1-cycloheptenyl)pyrrolidene (30 g., 0.18 mole), diethyl maleate (31.2 g., 0.18 mole) and acetonitrile (17 ml.) were combined and let stand at room temperature for one day. The solvent was removed by distillation under reduced pressure, leaving 61 g. (theory=61 g.) of diethyl 1 - pyrrolidinebicyclo[5.2.0]nonane - 8,9 - dicar-

11 boxylate, $N_D^{20}$ 1.4932. The infrared spectrum supported the assigned structure.

EXAMPLE 32

In a manner similar to Example 31, N-(1-cyclooctenyl)-piperidine (13 g., 0.067 mole) and diethyl maleate (11.6 g., 0.067 mole) were allowed to react to give 24 g. (theory=24.8 g.) of diethyl 1-piperidinebicyclo[6.2.0] decane-9,10-dicarboxylate, $N_D^{20}$ 1.4918.

EXAMPLE 33

N - methyl - 4 - (1 - pyrrolidinyl) - 1,2,3,6 - tetrahydropyridine (16.6 g., 0.1 mole) and diethyl maleate (17.2 g., 0.1 mole) were combined. The temperature of the mixture rose to a maximum of 66.5° C. after five minutes and then dropped back to room temperature. After 3 hours, an infrared spectrum of the product showed no double bond absorption. The yield of diethyl 3-methyl-6-pyrrolidinyl - 3 - azabicyclo[4.2.0]octane - 7,8 - dicarboxylate, a viscous liquid with $N_D^{20}$ 1.4893, is virtually quantitative.

EXAMPLE 34

N-(1-ethyl-1-propyenyl)dimethylamine (33 g., 0.29 mole), methyl acrylate (25 g., 0.29 mole), and acetonitrile (50 ml.) containing a pinch of hydroquinone were combined. A mild exothermic reaction took place and the temperature was maintained below 30° C. by intermittent cooling. After 3 hours standing an infrared spectrum obtained on the mixture showed only a very weak absorption bond in the double bond region (6–6.1 μ) An NMR spectrum on this material was consistent with the structure methyl 3-methyl-2-ethyl-2-dimethylaminecyclobutane-1-carboxylate.

EXAMPLE 35

N-(1-ethyl-1-propenyl)dimethylamine (20 g., 0.177 mole), diethyl maleate (30.5 g., 0.177 mole), and acetonitrile (50 ml.) containing a pinch of hydroquinone were combined. The temperature of the mixture rose to 54° C. within 18 minutes. The mixture was allowed to stand at room temperature for three days, after which it was stripped under reduced pressure to 75° C. at 0.5 mm. There was left 23 g. (46%) of diethyl-4-methyl-3-ethyl-3-dimethylaminecyclobutane-1,2-dicarboxylate, $N_D^{20}$ 1.4602. Infrared and NMR spectra were consistent with the proposed structure.

EXAMPLE 36

1-(2,5-dihydrofuran-3-yl)pyrrolidine, B.P. 55–59° C. at 0.3 mm., $N_D^{20}$ 1.5148, was prepared from 3-ketotetrahydrofuran and pyrrolidine. The structure of this enamine was shown by its NMR spectrum which ruled out the isomeric 4,5-dihydrofuran structure. To the above enamine (16.8 g., 0.12 mole) diethyl maleate (20.7 g., 0.12 mole) was added portionwise with cooling to keep the temperature below 50° C. After the reaction was complete, an infrared spectrum showed the complete disappearance of the enamine and maleate double bond absorptions. The product, a viscous oil, $N_D^{20}$ 1.4845, is essentially pure diethyl 1-(1-pyrrolidino)-3-oxabicyclo[3.2.0]heptane-6,7-dicarboxylate and is obtained in quantitative yield.

EXAMPLE 37

To N-(1-cyclohexenyl)morpholine (47 g., 0.28 mole) was added N-ethylmaleimide (35 g., 0.28 mole). An exothermic reaction took place, and intermittent cooling was used to keep the temperature below 40° C. After the reaction was complete, an infrared spectrum of the mixture showed no double bond absorption. The product, 1 - morpholinobicyclo[4.2.0]octane-7,8-dicarboxylic acid, N-ethylamide, is a viscous oil with $N_D^{20}$ 1.5208.

The following examples illustrate novel tertiaryaminocyclobutane salts within the scope of the invention and the use of the compounds of the invention as chemical intermediates in the preparation of primary amines and primary alcohols which are useful for a variety of purposes, e.g., the alcohols can be esterified with a dicarboxylic acid to form diesters which are useful plasticizers for synthetic resins.

EXAMPLE 38

To a reaction vessel was added a 7.7 part by weight portion of isopropyl alcohol and a 1.09 part by weight portion of citric acid. The resulting mixture was heated with stirring to 50° C. and maintained at 50° C. until solution was achieved. Then a 1.54 part by weight portion of diethyl 3,3-dimethyl-4-dimethylaminocyclobutane-1,2-dicarboxylate was added to the solution. The resulting mixture was heated to 60–65° C. and held at that temperature for 30 mintues. The reaction mixture was then cooled to about 30° C. over a period of 2 hours. The resulting mixture was then cooled to 15–20° C. and stirred for 12–14 hours to effect a crystallization of the citrate salt of diethyl 3,3-dimethyl-4-dimethylaminocyclobutane-1,2-carboxylate. The resulting mixture was filtered and the prepared salt recovered. In a similar manner, the corresponding hydrochloride salt can be prepared by substituting hydrochloric acid for the citric acid.

EXAMPLE 39

A 31 g. portion of diethyl 3,3-dimethyl-4-(1-piperidino)-cyclobutane-1,2-dicarboxylate was combined with 100 ml. of concentrated hydrochloric acid and heated under reflux for 6 hours. The solution was evaporated on a steam bath and the remaining solid residue triturated with hot n-butanol to give 17 g. of the hydrochloride salt of 3,3-dimethyl-4-(1-piperidino)cyclobutane - 1,2 - dicarboxylic acid, M.P. 234–5° C.

EXAMPLE 40

By the method described in Example 39, the hydrochloride salt of 3,3-dimethyl-4-dimethylaminocyclobutane-1,2-dicarboxylic acid, M.P. about 200° C., was prepared from diethyl 3,3-dimethyl-4-dimethylaminocyclobutane-1,2-dicarboxylate and hydrochloric acid.

EXAMPLE 41

A 150 g. portion of 3,3-dimethyl-2-(1-piperidino)cyclobutane carbonitrile in 200 ml. of methanol was hydrogenated over 10 g. of Raney nickel in the presence of 85 g. of anhydrous ammonia at 100° C. under 1000 p.s.i. of pressure. The resulting reaction mixture was filtered and distilled to give 78 g. of 3,3-dimethyl-2-(1-piperidino) cyclobutanemethylamine, B.P. 63–65° C. at 1 mm., $N_D^{20}$ 1.4841.

EXAMPLE 42

A 137 g. portion of 3,3-dimethyl-2-dimethylaminocyclobutane carbonitrile in 150 ml. of methanol of hydrogenated over 7 g. of Raney nickel in the presence of 75 g. of anhydrous ammonia at 100° C. and under 1000 p.s.i. of pressure. The reaction mixture was filtered and distilled to give, after removal of methanol, a 9 g. forerun, B.P. 36–51° C. at 40 mm.; 21 g. of 3,3-dimethylpiperdine, B.P. 51–52° C. at 40 mm., $N_D^{20}$ 1.4476; an intermediate fraction or cut of 4 g., B.P. 52–101° C. at 40 mm., and 64.5 g. of 3,3-dimethyl-2-dimethylaminocyclobutanemethylamine, B.P. 101–103° C. at 40 mm., $N_D^{20}$ 1.4600.

EXAMPLE 43

A solution of 56 g. of methyl 3,3-dimethyl-2-dimethylaminocyclobutanecarboxylate in 250 ml. of diethyl ether was added dropwise to a solution of 7.6 g. of lithium aluminium hydride in 150 ml. of diethyl ether at a rate sufficient to maintain the ether at reflux. The resulting mixture was stirred for one hour and then 8.8 g. of ethyl acetate was added followed by 18 ml. of water. The resulting mixture was filtered and the filtrate distilled to give, after removal of the ether solvent 30 g. of 3,3-dimethyl-2-dimethylaminocyclobutane methanol, B.P. 71–73° C. at 1 mm., $N_D^{20}$ 1.4644.

EXAMPLE 44

By the method described in Example 43, 3,3-dimethyl-2-morpholinocyclobutane methanol, B.P. 99–103° C. at 1.5–1.8 mm., M.P. 151–3° C. was prepared by substituting methyl 3,3-dimethyl-2-morpholinocyclobutanecarboxylate for the methyl 3,3-dimethyl-2-dimethylaminocyclobutanecarboxylate reactant.

EXAMPLE 45

By the method described in Example 43, 1-piperidinospiro [3.5]nonane-2-methanol, M.P. 105–106.5° C., was prepared by substituting methyl-1-piperidino-spiro[3.5]nonane-2-carboxylate for the methyl 3,3-dimethyl - 2 - dimethylaminocyclobutanecarboxylate reactant.

EXAMPLE 46

By the method described in Example 43, 3,3-dimethyl-4 - dimethylaminocyclobutane - 1,2 - dimethanol, B.P. 133–6° C. at 1 mm., $N_D^{20}$ 1.4821, was prepared by substituting diethyl 3,3 - dimethyl-4-dimethylaminocyclobutane - 1,2 - dicarboxylate for the methyl 3,3 - dimethyl-2-dimethylaminocyclobutanecarboxylate reactant.

EXAMPLE 47

By the method described in Example 43, 3,3-dimethyl-4 - pyrrolidinocyclobutane - 1,2 - dimethanol, B.P. 151–154° C. at 1.5–1.8 mm., $N_D^{20}$ 1.4986, was prepared by substituting dimethyl 3,3 - dimethyl - 4 - pyrrolidinocyclobutane - 1,2 - dicarboxylate for the methyl 3,3 - dimethyl-2 - dimethylaminocyclobutanecarboxylate reactant.

EXAMPLE 48

N - (1 - cyclopentyl)dimethylamine (55 g., 0.5 mole), methyl acrylate (43 g., 0.5 mole), and acetonitrile (150 ml.) containing a pinch of hydroquinone, were reacted according to the procedure described in Example 28, keeping the temperature of the mixture below 30° C. After removal of the solvent, the residue comprising 94 g. of methyl 1 - dimethylaminobicyclo[3.2.0]heptane - 7 - carboxylate was dissolved in anhydrous ether (100 ml.) and added dropwise to a slurry of lithium aluminum hydride (13 g., 0.34 mole) in anhydrous ether (300 ml.). The ether refluxed during this addition. The reaction mixture was allowed to stand overnight. Ethyl acetate (10 ml.) and water (75 ml.) were added and the solids were filtered off. Evaporation of the ether from the filtrate on a steam bath left 101 g. of residue. This residue was mixed with water (200 ml.) and concentrated hydrochloric acid (50 g.) and heated on the steam bath for 3 hours, cooled, extracted twice with ether (50 ml.), and made the aqueous phase basic with 10% sodium hydroxide solution, whereupon an oil separated. The oil was separated by extraction with ether and distilled to give 33 g. (39% based on 0.5 mole of methyl acrylate) of crude 1-dimethylaminobicyclo[3.2.0]heptane - 7 - methanol, B.P. 96–101° C. at ca. 1 mm., $N_D^{20}$ 1.4912. The existence of an absorption band at 5.78–5.79μ in the infrared spectrum of this material suggested the presence of a carbonyl component as an impurity.

The above reaction was repeated, using 0.47 mole quantities of starting material. There was obtained 30 g. (38%) of 1-dimethylaminobicyclo[3.2.0]heptane - 7 - methanol, which likewise contained a carbonyl impurity. The crude 1 - dimethylaminobicyclo[3.2.0]heptane - 7 - methanol from the above two preparations (63 g., 0.37 mole) was dissolved in a solution of water (100 ml.) and concentrated hydrochloric acid (35 ml.) and the resulting solution extracted 7 times with 100 ml. portions of ether. Evaporation of the combined extracts on a steam bath left 23.5 g. of "neutral material." The acidic aqueous phase was made basic with dilute sodium hydroxide solution and the oil layer which separated removed by extraction with ether. Distillation of this ethereal extract gave 27 g. of 1 - dimethylaminobicyclo[3.2.0]heptane - 7 - methanol, B.P. 96–99° C. at ca. 0.5 mm., $N_D^{20}$ 1.4975. The infrared and NMR spectra were consistent with the proposed structure.

*Analysis.*—Calcd. for $C_{10}H_{19}NO$: C, 70.9; H, 11.31. Found: C, 70.78; H, 11.23.

EXAMPLE 49

N - (1 - cyclohexenyl)dimethylamine (62.5 g., 0.5 mole), methyl acrylate (43 g., 0.5 mole), and acetonitrile (150 ml.) which contained a pinch of hydroquinone, were allowed to react keeping the temperature of the mixture below 30.° C. by means of intermittent cooling. The solvent was removed by distillation under reduced pressure and the methyl 1 - dimethylaminobicyclo[4.2.0]octane-8-carboxylate was then reduced with lithium aluminum hydride (13 g., 0.34 mole) as described in Example 48. The crude alcohol was heated for 2.5 hours on the steam bath in a mixture of water (250 ml.) and concentrated hydrochloric acid (50 g.). The mixture was cooled, extracted twice with 50 ml. portions of ether, and the acidic aqueous phase was made basic with 10% sodium hydroxide solution. The oil which separated was removed by extraction with ether. Distillation of the ethereal extracts gave, after removal of ether and a 2 g. forerun, 18.5 g. (21% based on starting methyl acrylate) of 1 - dimethyaminobicyclo [4.2.0]octane-8-methanol, B.P. 103–107° C. at 1 mm., $N_D^{20}$ 1.5043. Infrared and NMR spectra were consistent with the assigned structure.

*Analysis.*—Calcd. for $C_{11}H_{21}NO$: C, 72.2; H, 11.5. Found: C, 72.05; H, 11.47.

EXAMPLE 50

Diethyl 1 - piperidinobicyclo[3.2.0]heptane - 6,7 - dicarboxylate (161 g., 0.5 mole) was dissolved in ether (150 ml.) and the solution added dropwise with stirring to lithium aluminum hydride (25 g., 0.66 mole) dissolved in ether (700 ml.). The addition, which required 5 hours was done at such a rate so as to maintain gentle refluxing of the ether. The reaction mixture was allowed to stand overnight. Ethyl acetate (50 ml.) was added to decompose excess hydride, followed by water (200 ml.). The solids were filtered off and washed with ether and the combined ethereal filtrate and washings were evaporated on a steam bath. The residue crystallized to give 91 g. (76%) of 1 - piperidinobicyclo[3.2.0]heptane - 6,7 - dimethanol. A sample for melting point analysis was purified by taking it up in 10% hydrochloric acid, extraction with ether to remove neutral impurities, remaking it basic with dilute sodium hydroxide solution, and extraction with ether and evaporation on a steam bath. Recrystallization of the residue from toluene gave white crystals, M.P. 109–110° C. The infrared and NMR spectra were consistent with the proposed structure.

*Analysis.*—Calcd. for $C_{14}H_{25}NO_2$: C, 70.3; H, 10.5; N, 5.86; mol. wt. 23. Found: C, 70.62; H, 10.39; N, 5.53; mol. wt. 242.

EXAMPLE 51

Diethyl 1 - dimethylaminobicyclo[4.2.0]octane-7,8-dicarboxylate (90 g., ca. 0.3 mole) was reduced with lithium aluminum hydride (30 g., 0.79 mole) as described in Example 50. Distillation of the crude product gave 27.5 g. (43%, based on starting diethyl maleate) of 1-dimethylaminobicyclo[4.2.0]octane - 7,8 - dimethanol, B.P. 160–165° C. at 1 mm. The infrared spectrum was in agreement with the assigned structure.

A sample for analysis was purified as described in Example 50. The purified material boiled at 156–157° C. at ca. 0.3 mm., $N_D^{20}$ 1.5140.

*Analysis.*—Calcd. for $C_{14}H_{23}NO_2$: C, 67.7; H, 10.9. Found: C, 67.62; H, 10.99.

The following examples illustrate uses of the compounds of the invention as fuel oil or gasoline additives and as analgesics.

EXAMPLE 52

Utility as sludge and color stabilizers in petroleum hydrocarbons for several typical cyclobutane derivatives of the invention was determined by the Cities Service Oil Company accelerated stability test as described in Anal. Chem. 24, 1959 (1952). Three hundred fifty ml. samples of No. 2 fuel oil containing the subject cyclobutane derivatives at concentrations equivalent to 50 pounds of additive per 1000 barrels of oil, as well as control samples containing no additive, were heated at 100° C. in glass tubes while air was blown through the oil for 16 hours. At the end of the heating period the samples were filtered through 7 cm. No. 1 Whatman filter paper, the tube and the paper rinsed with light naphtha, and thereafter the filter paper air dried. The sludge retained on the filter paper was compared visually with a set of standard papers ranging from 0 (no visible sludge) to 10 (heavy black deposits). Also, the color of the aged oil was determined with an A.S.T.M. Union Colorimeter. The results are summarized in Table 1 below.

TABLE 1

| Stabilizer Additive | Results of Cities Service Test | |
|---|---|---|
| | Filter Pad Deposit | Oil Color |
| None | 7 | 5 |
| Diethyl 3,3-dimethyl-4-(1-piperidino)cyclobutane-1,2-dicarboxylate | 5 | +3.5 |
| 3,3-dimethyl-2-(1-piperidino)cyclobutanecarbonitrile | 5 | −3 |
| Diethyl 3,3-dimethyl-4-dimethylaminocyclobutane-1,2-dicarboxylate | 5 | +3.5 |
| Methyl 3,3-dimethyl-2-(1-piperidino)cyclobutanecarboxylate | 4.5 | 3 |
| Methyl 3,3-dimethyl-2-dimethylaminocyclobutanecarboxylate | 4 | 3 |

The derivatives prepared as described in Examples 43 to 47 were also found to have similar utility as sludge and color stabilizers in No. 2 fuel oil when tested by the described Cities Service Test.

EXAMPLE 53

The cyclobutane derivatives of the invention in combination with phenolic materials are useful as antioxidants in cracked gasoline. Several samples of gasoline containing 0.005% by weight of p-n-butylaminophenol plus 0.001% by weight of one of the following cyclobutane derivatives of the invention were subjected to the well-known UOP oxygen bomb test:

(a) diethyl 3,3-dimethyl-4-(1-piperidino)-1,2-cyclobutanedicarboxylate;
(b) 3,3-dimethyl-2-(1-piperidino)cyclobutane-carbonitrile; and
(c) diethyl 3,3-dimethyl-4-dimethylaminocyclobutane-1,2-dicarboxylate.

The induction period of gasoline by the UOP oxygen bomb test for each of the stabilizer combination was at least 835 minutes while that of the gasoline containing only 0.005% by weight of p-n-butylaminophenol was 795 minutes. The induction period for gasoline containing only (a), (b) or (c) was no different from that of gasoline containing no additive at all.

EXAMPLE 54

This example shows analgesic effect on rats by the tail flick test. This test is performed by uniformly blackening the tails of rats, administering an analgesic to the animal and subsequently focusing a beam of light on the animal's tail at various intervals after administration of the analgesic. The time required for the animal to flick its tail after the beam of light is applied determines the analgesic effect of the material being tested. The longer the interval for the tail flick, after the application of the concentrated beam of light, the more effective is the analgesic. Predetermined dosages of diethyl 3,3-dimethyl-4-dimethylaminocyclobutane - 1,2-dicarboxylate·HCl, D-propoxyphene·HCl and the very strong narcotic types of analgesics such as morphine sulfate and codeine phosphate were given to rats. Each material was administered orally to sets of fifteen animals except for morphine sulfate which was given subcutaneously to fifteen animals and codeine phosphate which was given orally to twenty-five animals. The following quantities of each material were used: morphine sulfate, 1.5 milligrams per kilogram weight of each animal; D-propoxyphene·HCl, 25 milligrams per kilogram weight of each animal; codeine phosphate, 40 milligrams per kilogram weight of each animal; and diethyl 3,3-dimethyl-4-dimethylaminocyclobutane - 1,2 - dicarboxylate·HCl, 100 milligrams per kilogram weight of each animal. The time in seconds during which the animals could tolerate the concentrated beam of light at various intervals after administration of the analgesics is given in Table 2 below. The values in the table are averages for the animals in each set.

TABLE 2

| | Time in minutes after administration of analgesic | | | |
|---|---|---|---|---|
| | (1) | 20 | 40 | 60 |
| Time in seconds for pain response of animals treated with: | | | | |
| Morphine sulfate | 14.3 | 5.8 | 6.0 | 5.3 |
| D-propoxyphene·HCl | 14.3 | 5.7 | 5.9 | 4.9 |
| Codeine phosphate | 14.3 | 5.8 | 5.6 | 5.1 |
| Diethyl 3,3-dimethyl-4-dimethylaminocyclobutane-1,2-dicarboxylate·HCl | 14.3 | 5.7 | 5.4 | 4.9 |

[1] Immediately prior to administration of analgesic.

Table 2 shows that an oral dose of 100 mg. of the cyclobutane compound per kg. weight of the animal is equivalent in analgesic potency to oral doses of either 25 mg./kg. of D-propoxyphene·HCl or 40 mg./kg. of codeine phosphate and to a subcutaneous dose of 1.5 mg./kg. of morphine sulfate.

EXAMPLE 55

This example shows analgesic tests on rats by the tail flick test as described in Example 54. Predetermined dosages of methyl 3,3-dimethyl-4-dimethylaminocyclobutane-1-carboxylate·HCl were administered orally to rats. Each dosage level contained five animals and the results are given in Table 3, below, as the average time in seconds for the pain response of the animals in each dosage level.

TABLE 3

| | Time in minutes after administration of analgesic | | | |
|---|---|---|---|---|
| | (1) | 20 | 40 | 60 |
| Time required in seconds for pain response of animals tested with the following quantities of methyl 3,3-dimethyl-2-dimethylaminocyclobutane-1-carboxylate·HCl: | | | | |
| 100 mg. per kg | 14.2 | 5.5 | 5.7 | 4.9 |
| 175 mg. per kg | 14.2 | 6.4 | 5.5 | 4.6 |

[1] Immediately prior to administration of analgesic.

EXAMPLE 56

This example shows analgesic tests on rats by the tail flick test as described in Example 54. Predetermined dosages of methyl 2,2-dimethyl-3-(1-piperidino)cyclobutane-1-carboxylate·HCl were administered orally to rats. Five animals were used with each dosage level. The results are given in Table 4 as the average time in seconds for the pain response of the animals in each group.

TABLE 4

|  | Time in minutes after administration of analgesic | | |
|---|---|---|---|
|  | (1) | 20 | 40 |
| Time required in seconds for pain response: | | | |
| 150 mg. per kg | [1] 4.4 | 5.0 | 4.3 |
| 200 mg. per kg | [1] 4.4 | 5.0 | 4.7 |

[1] Immediately prior to administration of analgesic.

EXAMPLE 57

This example shows analgesic tests on rats by the tail flick test as described in Example 54. The tests were performed with the following nine compounds which were administered orally to rats.

Compound 1.—1-(2,2-dimethyl-4-nitro-3-phenyl-cyclobutyl)piperidine
Compound 2.—3,3-dimethyl-2-(1-piperidino)cyclobutane-1-carbonitrile
Compound 3.—2,2-dimethyl-3-(1-piperidino)cyclobutylmethylamine
Compound 4.—cyclobutanecarbonitrile 2-dimethylamino-3,3-dimethyl Compound 5.—N,N,2,2-tetramethyl-4-methylsulfonylcyclobutylamine
Compound 6.—N,N,4,4-tetramethyl-2-phenyl-2-cyclobutenamine
Compound 7.—1,4-Bis(4-methoxycarbonyl-2,2-dimethylcyclobutyl)-piperazine
Compound 8.—methyl 3,3-diethyl-2-(1-piperidino)cyclobutane-1-carboxylate
Compound 9.—secondary butyl 3,3-dimethyl-2-dimethylaminocyclo-butane-1-carboxylate The results of the test are given in Table 5 below which shows the increase in analgesic effect over control values for each compound at various time intervals and also at various dosages. The dosages are expressed in milligrams of the active compound per kilogram weight of the animal. The time at which the animals were tested after the administration of the analgesic is given in Table 5 below. Values are also shown for aspirin and codeine which were run by the same method. The control value represents the time required for a tail flick by the rats when tested by the method of Example 54 but when no analgesic is given to the animal. The control value is about 4.3 seconds.

TABLE 5

| Compound: | Dose, mg./kg. | Time, minutes | Increase in analgesic effect over control values (in seconds) |
|---|---|---|---|
| 1 | 200 | 20 | 0.8 |
| 2 | 150 | 5 | [1] 2.8 |
| 3 | 75 | 20 | 1.6 |
| 4 | 20 | 40 | 0.6 |
| 5 | 300 | 20 | 1.1 |
| 6 | 50 | 20 | 1.8 |
| 7 | 300 | 20 | 1.2 |
| 8 | 300 | 20 | 1.0 |
| 9 | 300 | 20 | 2.2 |
| Aspirin | 200 | 20 | 0.4 |
| Codeine | 40 | 20 | 1.6 |

[1] 0.7 sec. at 20 min.

EXAMPLE 58

Utility as sludge and color stabilizers in petroleum hydrocarbons for several typical cyclobutane derivatives of the invention was determined by the Cities Service Oil Company accelerated stability test as described in Anal. Chem. 24, 1959 (1951). Three hundred fifty ml. samples of No. 2 fuel oil containing the subject cyclobutane derivatives at concentrations equivalent to 50 pounds of additive per 1000 barrels of oil, as well as control samples containing no additive, were heated at 100° C. in glass tubes while air was blown through the oil for 16 hours. At the end of the heating period the samples were filtered through 7 cm. No. 1 Whatman filter paper, the tube and the paper rinsed with light naphtha, and thereafter the filter paper air dried. This sludge retained on the filter paper was compared visually with a set of standard papers ranging from 0 (no visible sludge) to 10 (heavy black deposits). Also, the color of the aged oil was determined with an A.S.T.M. Union Colorimeter. The results are summarized in Table 6 below.

TABLE 6

| Stabilizer Additive | Filter Pad Deposit | | Oil Color | |
|---|---|---|---|---|
|  | Oil A | Oil B | Oil A | Oil B |
| None | 6.5 | 8.5 | 5 | +5 |
| Methyl 3-ethyl-2-piperidinocyclobutanecarboxylate | 2.5 | 2.5 | 2 | 2 |
| Methyl 4-dimethylamino-3-ethylcyclobutanecarboxylate | 2.5 | 2.5 | 2 | 7 |
| Diethyl 4-dimethylamino-3-ethyl-1,2-cyclobutanedicarboxylate | 2.5 | 2 | 2.5 | 3 |
| Methyl (3-methyl-2-piperidinocyclobutyl)sulfone | 2.5 | 2 | 2 | 2 |

The following examples illustrate the preparation of enamines that are useful in the process of the invention.

EXAMPLE 59

The preparation of N,N-dibutyl isobutenyl amine was accomplished as follows. Isobutyraldehyde (180 g., 2.5 moles) was added over a ⅓-hour period to dibutylamine. The reaction mixture was then refluxed under a Dean-Stark trap for 12 hours during which time 30 ml. of water was collected. Fractional distillation of the mixture gave, after removal of low boilers, 228 g. (63%) of N,N-dibutylisobutenylamine, B.P. 70.5–72° C. at 4.5–5.2 mm., $N_D^{20}$ 1.4409.

EXAMPLE 60

In a manner similar to that described in Example 59, isobutyraldehyde and diisobutylamine gave N,N-diisobutenylamine, B.P. 64° C. at 5.8 mm. $N_D^{20}$ 1.4375, in 57% yield.

EXAMPLE 61

In a manner similar to that described in Example 59, cyclohexanecarboxaldehyde and piperidine gave 1-cyclohexylidenemethyl piperidine, B.P. 88° C. at 3 mm., $N_D^{20}$ 1.5042, in 85% yield.

EXAMPLE 62

In a manner similar to that described in Example 59, 2-ethylbutyraldehyde and piperidine gave N-(2-ethyl-1-butenyl) piperidine, B.P. 103–110° C. at 37–45 mm., $N_D^{20}$ 1.4693, in 87% yield.

EXAMPLE 63

Over a 2-hour period isobutyraldehyde (400 g., 5 moles) was added to piperazine (172 g., 2 moles) at 35–40° C. The mixture was stirred and refluxed under a Dean-Stark trap for 7 hours, during which time 74 ml. of water was collected. Distillation of the reaction mixture gave, after removal of low boilers, 221 g. (57%) of 1,4-diisobutenyl piperazine, B.P. 70–75° C. at 2 mm., M.P. 35–37° C.

EXAMPLE 64

A chilled mixture of isobutyraldehyle (288 g., 4 moles), 500 ml. of xylene and 150 g. of anhydrous potassium carbonate was charged to an autoclaves. Then dimethylamine (200 g., 4.4 moles) was added and the autoclave was closed and heated at 100° C., for 4 hours. The autoclave was allowed to cool, was vented cautiously and discharged. The mixture was filtered by gravity and the filtrate was distilled to give, after removal of unreacted starting materials, 198 g. (50%) of N,N-dimethylisobutenylamine, B.P. 87–89° C., $N_D^{20}$ 1.4219.

The novel esters of my invention in which Y or Z or both are alkoxycarbonyl groups are useful as chemical intermediates in the preparation of carboxamides which are useful for a number of purposes, for example, as anagesics, as stabilizers for fuel oil, etc., as disclosed in U.S. Patent 3,133,924. The amides can be prepared from my esters by reacting a methanolic solution of a compound of my invention in which either Y or Z or both are alkoxycarbonyl groups with ammonia or a primary or secondary amine, preferably in the presence of sodium methoxide.

The following example illustrates such a preparation.

EXAMPLE 65

An 18.5 g. portion of metyl 3,3-dimethyl-2-dimtehylamino-cyclobutane carboxylate was dissolved in 100 ml. of methanol and 8 g. of anhydrous ammonia was bubbled there through. The solution was allowed to stand at room temperature for 8 days. The solution was then evaporated on a steam bath and the resulting residue taken up in n-hexane and filtered. The resulting filtered precipitate was washed with diethyl ether to give 0.8 g. of 3,3-dimethyl-2-dimethylaminocyclobutane carboxamide, M.P. 142° C.

Although the invention has been described in considerable detail with particular reference to certain preferred embodiments thereof, variations and modifications can be effected within the spirit and scope of the invention as described hereinbefore and as defined in the appended claims.

I claim:

1. A tertiary aminocyclobutane having the formula:

$$X-CH-\underset{R^2}{\overset{}{C}}-R^3$$
$$Y-CH-CH-Z$$

wherein X is a tertiaryamino group having a formula selected from the group consisting of:

(a) 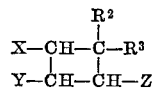   and   (b) 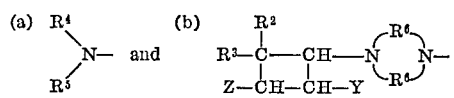

Y is alkylsulfonyl of the formula—$SO_2R^7$; Z is hydrogen, phenyl, or alkylsulfonyl of the formula—$SO_2R^7$;
wherein each of $R^2$ and $R^3$, when taken singly, is lower alkyl and $R^2$ and $R^3$, when taken collectively with the carbon atom to which they are attached, represent a saturated carboxylic group selected from the group consisting of:
 (a) cyclobutylidene,
 (b) cyclopentylidene,
 (c) cyclohexylidene,
 (d) cycloheptylidene, and
 (e) cyclooctylidene;
wherein each of $R^4$ and $R^5$, when taken singly, is lower alkyl and $R^4$ and $R^5$, when taken collectively with the nitrogen atom to which they are attached, represent a heterocyclic group selected from the group consisting of:
 (a) pyrrolidino,
 (b) piperidino, and
 (c) morpholino;
wherein each of the substituents $R^6$ is an ethylene group and $R^7$ is a lower alkyl.

2. A tertiaryaminocyclobutane having the formula:

$$X-CH-CH-R^3$$
$$Y-CH-CH-Z$$

wherein X is a tertiaryamino group having a formula selected from the group consisting of:

(a) 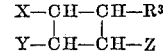   and   (b) 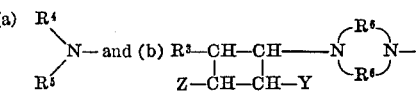

Y is alkylsulfonyl of the formula $SO_2R^7$; Z is hydrogen, phenyl, or alkylsulfonyl of the formula—$SO_2R^7$;
wherein $R_3$ is selected from the group consisting of:
 (a) lower alkyl,
 (b) phenyl, and
 (c) tertiaryaminomethyl of the formula—$CH_2X$;
wherein each of $R^4$ and $R^5$, when taken singly, is lower alkyl and $R^4$ and $R^5$, when taken collectively with the nitrogen atom to which they are attached, represent a heterocyclic group selected from the group consisting of:
 (a) pyrrolidino,
 (o) piperidino, and
 (c) morpholino;
wherein each of the substituents $R^6$ is an ethylene group and $R^7$ is lower alkyl.

3. A tertiaryaminocyclobutane having the formula:

$$X-\underset{R^1}{\overset{}{C}}-CH-R^3$$
$$Y-CH-CH-Z$$

wherein X is a tertiaryamino group having a formula selected from the group consisting of:

(a) 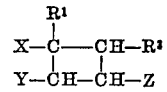

and (b) 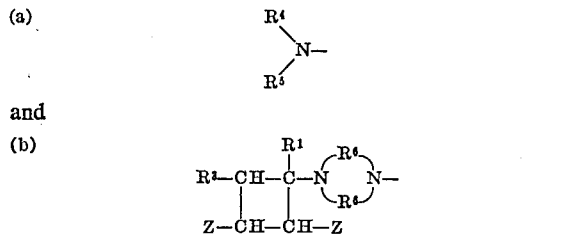

Y is alkylsulfonyl of the formula —$SO_2R^7$, Z is hydrogen, phenyl, or alkylsulfonyl of the formula —$SO_2R^7$;
wherein each of $R^1$ and $R^3$, when taken singly, is lower alkyl and $R^1$ and $R^3$, when taken collectively with the carbon atoms to which they are attached, represent a group selected from the group consisting of:
 (a) 1,2-cyclopentylene,
 (b) 1,2-cyclohexylene,
 (c) 1,2-cycloheptylene,
 (d) 1,2-cyclooctylene,
 (e) tetrahydrofuran-3,4-ylene,
 (f) tetrahydrofuran-2,3-ylene,
 (g) N-methylpiperidin-2,3-ylene, and
 (h) N-methylpiperidin-3,4-ylene;

wherein each of R⁴ and R⁵, when taken singly, is lower alkyl and R⁴ and R⁵, when taken collectively with the nitrogen atom to which they are attached, represent a heterocyclic group selected from the group consisting of:

(a) pyrrolidino,
(b) piperidino, and
(c) morpholino;

wherein each of the substituents R⁶ is an ethylene group and R⁷ is lower alkyl.

4. The process for preparing a tertiaryaminocyclobutane which comprises contacting an enamine of the formula:

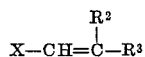

with a substituted olefin of the formula:

Y—CH=CH—Z at a temperature of about 0° C. to about 200° C. and obtaining a tertiaryaminocyclobutane of the formula:

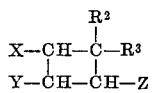

wherein X, of the enamine, is a tertiaryamino group having a formula selected from the group consisting of:

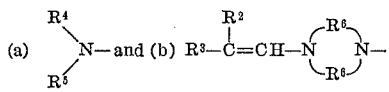

and X, of the tertiaryaminocyclobutane, is a tertiaryamino group having a formula selected from the group consisting of:

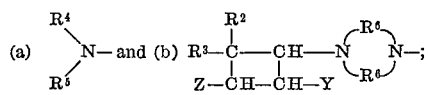

Y is alkylsulfonyl of the formula —SO₂R⁷; Z is hydrogen, phenyl, or alkylsulfonyl of the formula —SO₂R⁷; wherein each of R² and R³, when taken singly, is alkyl of 1 to 18 carbons and R² and R³, when taken collectively with the carbon atom to which they are attached, represent a saturated carbocyclic group having 4 to 8 ring carbons selected from the group consisting of:

(a) cyclobutylidene,
(b) cyclopentylidene,
(c) cyclohexylidene,
(d) cycloheptylidene, and
(e) cyclooctylidene;

wherein each of R⁴ and R⁵, when taken singly, is alkyl of 1 to 18 carbons and R⁴ and R⁵, when taken collectively with the nitrogen atom to which they are attached, represent a saturated heterocyclic group having 5 to 6 ring atoms selected from the group consisting of pyrrolidino, piperidino, and morpholino; each of the substituents R⁶ is an alkylene group of 2 carbon atoms; and R⁷ is alkyl of 1 to 18 carbons.

5. The process for preparing a tertiaryaminocyclobutane which comprises contacting an enamine of the formula:

X—CH=CH—R³ with a substituted olefin of the formula:

Y—CH=CH—Z at a temperature of about 0° C. to about 150° C. and obtaining a tertiaryaminocyclobutane of the formula:

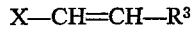
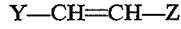

wherein X, of the enamine, is a tertiaryamino group having a formula selected from the group consisting of:

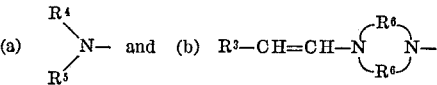

and X, of the tertiaryaminocyclobutane, is a tertiaryamino group having a formula selected from the group consisting of:

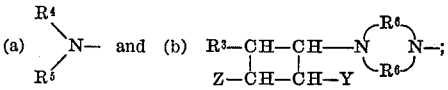

Y is alkyl sulfonyl of the formula —SA₂R⁷; Z is hydrogen, phenyl, or alkylsulfonyl of the formula —SO₂R⁷; wherein R³ is selected from the group consisting of:

(a) alkyl of 1 to 18 carbons,
(b) phenyl, and
(c) tertiaryaminomethyl of the formula —CH₂X; wherein X is defined above with respect to the tertiaryaminocyclobutane;

wherein each of R⁴ and R⁵, when taken singly, is alkyl of 1 to 18 carbons and R⁴ and R⁵, when taken collectively with the nitrogen atom to which they are attached, represent a saturated heterocyclic group having 5 to to 6 ring atoms selected from the group consisting of pyrrolidino, piperidino, and morpholino;

each of the substituents R⁶ is an alkylene group of 2 carbon atoms; and R⁷ is alkyl of 1 to 18 carbons.

6. The process for preparing a tertiaryaminocyclobutane which comprises contacting an enamine of the formula:

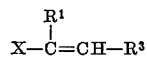

with a substituted olefin of the formula:

Y—CH=CH—Z at a temperature of about 0° C. to about 55° C. and obtaining a tertiaryaminocyclobutane of the formula:

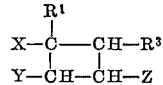

wherein X, of the enamine, is a tertiaryamino group having a formula selected from the group consisting of:

(a) 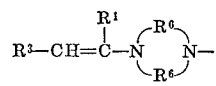

and (b) 

and X, of the tertiaryaminocyclobutane, is a tertiaryamino group having a formula selected from the group consisting of:

(a) 

and (b) 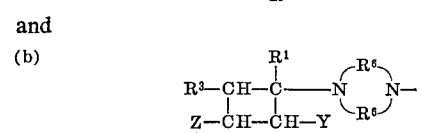

Y is alkylsulfonyl of the formula —SO₂R⁷; Z is hydrogen, phenyl, or alkylsulfonyl of the formula —SO₂R⁷;

wherein each of $R^1$ and $R^3$, when taken singly, is alkyl of 1 to 18 carbons and $R^1$ and $R^3$, when taken collectively with the carbon atoms to which they are attached, represent a group having 5 to 8 ring atoms selected from the group consisting of:

(a) 1,2-cyclopentylene,
(b) 1,2-cyclohexylene,
(c) 1,2-cycloheptylene,
(d) 1,2-cyclooctylene,
(e) tetrahydrofuran-3,4-ylene,
(f) tetrahydrofuran-2,3-ylene,
(g) N-methylpiperidin-2,3-ylene, and
(h) N-methylpiperidin-3,4-ylene;

wherein each of $R^4$ and $R^5$, when taken collectively with the nitrogen atom to which they are attached, represent a saturated heterocyclic group having 5 to 6 ring atoms selected from the group consisting of pyrrolidino, piperidino, and morpholino; each of the substituents $R^6$ is an alkylene group of 2 carbon atoms;

and $R^7$ is alkyl of 1 to 18 carbons.

7. A compound according to claim 2 in which the compound is N,N,2,2-tetramethyl - 4 - methylsulfonylcyclobutane amine.

8. A compound according to claim 3 in which the compound is 3 - methyl - 2 - piperidino-1-methylsulfonylcyclobutane.

References Cited

UNITED STATES PATENTS

| | | | |
|---|---|---|---|
| 3,051,622 | 8/1962 | Kuna et al. | 167—65 |
| 3,133,924 | 5/1964 | Wilson et al. | 260—268 |

HENRY R. JILES, Primary Examiner

R. T. BOND, Assistant Examiner

U.S. Cl. X.R.

44—63, 74; 252—47, 47.5; 260—247.1, 247, 247.2, 247.5, 268, 293, 293.4, 294.3, 313, 326.3, 326.8, 326.82, 326.85, 346.2, 464, 468, 563, 570.5; 424—248, 250, 267, 244, 274, 325